US011761789B2

(12) United States Patent
Ma et al.

(10) Patent No.: US 11,761,789 B2
(45) Date of Patent: *Sep. 19, 2023

(54) APPARATUS AND ASSOCIATED METHODS FOR USE IN LANE-LEVEL MAPPING OF ROAD INTERSECTIONS

(71) Applicant: HERE Global B.V., Eindhoven (NL)

(72) Inventors: Xiang Ma, Chicago, IL (US); Xin Chen, Evanston, IL (US); Vlad Zhukov, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 708 days.

This patent is subject to a terminal disclaimer.

(21) Appl. No.: 16/701,270

(22) Filed: Dec. 3, 2019

(65) Prior Publication Data
US 2020/0103237 A1    Apr. 2, 2020

Related U.S. Application Data

(63) Continuation of application No. 14/511,603, filed on Oct. 10, 2014, now Pat. No. 10,533,863.

(51) Int. Cl.
*G01C 21/00* (2006.01)
*G08G 1/01* (2006.01)
*G01C 21/32* (2006.01)

(52) U.S. Cl.
CPC ..... *G01C 21/3841* (2020.08); *G01C 21/3819* (2020.08); *G08G 1/0112* (2013.01); *G08G 1/0129* (2013.01); *G01C 21/32* (2013.01)

(58) Field of Classification Search
CPC .............................. G01C 21/32; G08G 1/0112
(Continued)

(56) References Cited

U.S. PATENT DOCUMENTS

| 4,882,696 A | 11/1989 | Nimura et al. |
| 4,937,570 A | 6/1990 | Matsukawa et al. |

(Continued)

FOREIGN PATENT DOCUMENTS

| EP | 13163767 | 4/2013 |
| WO | WO 2010/105712 | 9/2010 |

(Continued)

OTHER PUBLICATIONS

US Dept of Transportation Federal Highway Administration, Work Zone Performance Measurement Using Probe Data, Publication No. FHWA-HOP-13-043, Sep. 2013, pp. 1-48 (Year: 2013).*

(Continued)

*Primary Examiner* — Paul D Lee
(74) *Attorney, Agent, or Firm* — Alston & Bird LLP

(57) ABSTRACT

An apparatus comprising a processor and memory including computer program code, the memory and computer program code configured to, with the processor, enable the apparatus at least to:

generate, in respect of a road intersection, grouped probe data using probe data derived from probed vehicular movements through the road intersection, wherein the grouped probe data is generated by grouping together probe data comprising vehicle trajectories which have respective common heading angles at points of entry to and exit from the road intersection; and provide the grouped probe data for use in lane-level mapping of the road intersection.

17 Claims, 5 Drawing Sheets

(58) Field of Classification Search
USPC .......................................................... 702/5
See application file for complete search history.

(56) References Cited

U.S. PATENT DOCUMENTS

| | | | |
|---|---|---|---|
| 5,206,811 | A | 4/1993 | Itoh et al. |
| 5,948,042 | A | 9/1999 | Heimann et al. |
| 6,076,041 | A | 6/2000 | Watanabe |
| 6,385,539 | B1 | 5/2002 | Wilson et al. |
| 6,388,582 | B2 | 5/2002 | Yamashita et al. |
| 6,473,693 | B1 | 10/2002 | Kusama |
| 6,556,916 | B2 | 4/2003 | Waite et al. |
| 6,700,505 | B2 | 3/2004 | Yamashita et al. |
| 6,850,841 | B1 | 2/2005 | Casino |
| 8,868,335 | B2 | 10/2014 | Nowak et al. |
| 8,892,356 | B1 | 11/2014 | Weiland et al. |
| 9,341,485 | B1 | 5/2016 | Weiland et al. |
| 2001/0013837 | A1 | 8/2001 | Yamashita et al. |
| 2002/0053984 | A1 | 5/2002 | Yamashita et al. |
| 2005/0004753 | A1 | 1/2005 | Weiland et al. |
| 2010/0179755 | A1 | 7/2010 | Kohno et al. |
| 2010/0292922 | A1 | 11/2010 | Tanizaki et al. |
| 2011/0040468 | A1 | 2/2011 | Leineweber et al. |
| 2011/0109475 | A1 | 5/2011 | Basnayake et al. |
| 2011/0196611 | A1* | 8/2011 | Smartt ............... G01C 21/3844 702/5 |
| 2012/0095682 | A1 | 4/2012 | Wilson |
| 2013/0278443 | A1 | 10/2013 | Rubin et al. |
| 2013/0282264 | A1 | 10/2013 | Bastiaensen et al. |
| 2014/0074393 | A1 | 3/2014 | Kojima et al. |
| 2014/0249748 | A1 | 9/2014 | Strassenburg-Kleciak |
| 2014/0358414 | A1 | 12/2014 | Ibrahim et al. |
| 2015/0019128 | A1 | 1/2015 | Weiland et al. |
| 2015/0198456 | A1 | 7/2015 | Ishikawa et al. |
| 2015/0362327 | A1 | 12/2015 | Weiland et al. |
| 2016/0153788 | A1 | 6/2016 | Weiland et al. |
| 2017/0045370 | A1 | 2/2017 | Weiland et al. |
| 2019/0129437 | A1* | 5/2019 | Liu ....................... B60W 40/02 |

FOREIGN PATENT DOCUMENTS

| | | |
|---|---|---|
| WO | WO 2010/129192 | 11/2010 |
| WO | WO 2013/160471 | 10/2013 |
| WO | WO 2014/024512 | 2/2014 |
| WO | WO 2016/055248 | 4/2016 |

OTHER PUBLICATIONS

WO2019086055A2, Method and device for generating intersection road network data (Year: 2019).*
Advisory Action for U.S. Appl. No. 14/511,603 dated Jan. 30, 2019.
Han, Data Mining, Concepts & Techniques, 2012, Morgan Kaufmann, 3rd Edition, Chapter 10, pp. 443-495.
International Search Report and Written Opinion for Application No. PCT/EP2015/071203 dated Nov. 20, 2015.
Office Action for U.S. Appl. No. 14/511,603 dated Aug. 10, 2017.
Office Action for U.S. Appl. No. 14/511,603 dated Mar. 2, 2017.
Office Action for U.S. Appl. No. 14/511,603 dated May 14, 2018.
Office Action for U.S. Appl. No. 14/511,603 dated Nov. 15, 2017.
Office Action for U.S. Appl. No. 14/511,603 dated Nov. 15, 2018.
Schroedl, S. et al, "Mining GPS Traces for MAP Refinement", Data Mining and Knowledge Discovery, 9, 2004, 59-87.
Touir, A. et al., Design and Implementation of an Automatic Road Network Map Processing System Using GPS Jul. 14-18, 2003, 7 pages.
Office Action for U.S. Appl. No. 14/511,603 dated Mar. 22, 2019, 18 pages.
Office Action for European Application No. 15 767 455.7 dated May 3, 2019, 6 pages.
Notice of Allowance for U.S. Appl. No. 14/511,603 dated Aug. 30, 2019.

* cited by examiner

APPARATUS AND ASSOCIATED METHODS FOR USE IN LANE-LEVEL MAPPING OF ROAD INTERSECTIONS

CROSS-REFERENCE TO RELATED APPLICATIONS

This application is a continuation of and claims priority to U.S. patent application Ser. No. 14/511,603, filed on Oct. 10, 2014, the contents of which are hereby incorporated by reference in their entirety.

TECHNICAL FIELD

The present disclosure relates to the field of road mapping, associated methods and apparatus, and in particular concerns an apparatus configured to generate and provide grouped probe data for use in lane-level mapping of a road intersection. Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), smartwatches, smart eyewear and tablet PCs. In some example embodiments, the apparatus may be built in to a vehicle, for example, as part of a (e.g. satellite) navigation system.

The portable electronic devices/apparatus according to one or more disclosed example aspects/embodiments may not be limited to just navigation/road mapping functionality but may provide one or more audio/text/video communication functions (e.g. telecommunication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Research is currently being done to develop improved navigation devices which can provide a user with more detailed information about road networks to further aid route navigation.

One or more aspects/embodiments of the present disclosure may or may not address this issue.

The listing or discussion of a prior-published document or any background in this specification should not necessarily be taken as an acknowledgement that the document or background is part of the state of the art or is common general knowledge.

SUMMARY

According to a first aspect, there is provided an apparatus comprising a processor and memory including computer program code, the memory and computer program code configured to, with the processor, enable the apparatus at least to:
generate, in respect of a road intersection, grouped probe data using probe data derived from probed vehicular movements through the road intersection, wherein the grouped probe data is generated by grouping together probe data comprising vehicle trajectories which have respective common heading angles at points of entry to and exit from the road intersection; and
provide the grouped probe data for use in lane-level mapping of the road intersection.

The grouped probe data may be generated by further grouping together probe data comprising vehicle trajectories which have respective common heading angles at one or more points within the road intersection.

The probe data for each vehicle trajectory may comprise at least one of the geographic location and heading angle of the vehicle at a plurality of points on the trajectory.

The probe data may be derived from the probed vehicular movements of all vehicles, or one or more predetermined vehicles, travelling through the road intersection over a period of time.

The apparatus may be configured to generate and provide updated grouped probe data using probe data derived from subsequent probed vehicular movements through the road intersection. The apparatus may be configured to generate and provide the updated grouped probe data one or more of periodically, in real-time and whenever the probe data derived from subsequent vehicular movements becomes available.

The common heading angles may comprise all heading angles which fall within one or more of $\pm 1°$, $\pm 5°$, $\pm 10°$, $\pm 15°$, $\pm 20°$, $\pm 25°$, $\pm 30°$, $\pm 35°$, $\pm 40°$ and $\pm 45°$ of one another.

The common heading angles at the points of entry may be the same as, or different to, the common heading angles at the points of exit.

The points of entry to and exit from the road intersection may correspond to geographical locations on respective inbound and outbound lanes of road segments of the road intersection at a predefined distance from a reference position (e.g. centre) of the road intersection.

The points of entry to and exit from the road intersection may correspond to geographical locations at which the respective vehicles cross a predefined boundary encompassing the road intersection. The boundary may be predefined such that each edge of the boundary is perpendicular to the length of a respective road segment of the road intersection.

The apparatus may be configured to group the probe data using one or more clustering techniques. The one or more clustering techniques may comprise k-means clustering.

The road intersection may comprise one or more of a junction, a crossroad, a roundabout, an interchange, an onramp, an off-ramp, a road or lane merge, and a road or lane split.

According to a further aspect, there is provided a method comprising:
generating, in respect of a road intersection, grouped probe data using probe data derived from probed vehicular movements through the road intersection, wherein the grouped probe data is generated by grouping together probe data comprising vehicle trajectories which have common heading angles at respective points of entry to and exit from the road intersection; and
providing the grouped probe data for use in lane-level mapping of the road intersection.

According to a further aspect, there is provided an apparatus comprising a processor and memory including computer program code, the memory and computer program code configured to, with the processor, enable the apparatus at least to:
use grouped probe data, in respect of a road intersection, in lane-level mapping of the road intersection, the grouped probe data comprising probe data derived from probed vehicular movements through the road intersection which have been grouped together by probe data with vehicle trajectories which have respective common heading angles at points of entry to and exit from the road intersection.

The apparatus may be configured to filter the grouped probe data to remove any probe data in respect of vehicle trajectories which constitute one or more of noise and outliers.

Each group of probe data may define a separate path of travel from an inbound road segment to a corresponding outbound road segment, and the apparatus may be configured to determine a centreline which defines a shape of the path of travel by minimising the average distance of all trajectories within the group to the centreline.

The apparatus may be configured to determine a width of the path of travel based on the physical distance between the outermost trajectories at one or more points along the centreline.

The apparatus may be configured to determine the number of lanes within the path of travel by dividing the width of the path of travel by a known typical lane width.

The apparatus may be configured to create a graphical representation of the road intersection using the shape and width of each path of travel through the road intersection and the number of lanes within each path of travel.

According to a further aspect, there is provided a method comprising:
  using grouped probe data, in respect of a road intersection, in lane-level mapping of the road intersection, the grouped probe data comprising probe data derived from probed vehicular movements through the road intersection which have been grouped together by probe data with vehicle trajectories which have respective common heading angles at points of entry to and exit from the road intersection.

According to a further aspect, there is provided a system comprising a first apparatus and a second apparatus, the first apparatus and second apparatus having a processor and memory including computer program code, the memory and computer program code configured to, with the processor:
  enable the first apparatus at least to:
    generate, in respect of a road intersection, grouped probe data using probe data derived from probed vehicular movements through the road intersection, wherein the grouped probe data is generated by grouping together probe data comprising vehicle trajectories which have common heading angles at respective points of entry to and exit from the road intersection; and
    provide the grouped probe data to the second apparatus; and
  enable the second apparatus at least to:
    use the grouped probe data in lane-level mapping of the road intersection.

The first apparatus and second apparatus may comprise one or both of a respective processor and memory, and a common processor and memory. Therefore, in certain embodiments, the first apparatus and second apparatus may share components (e.g. one or more of a processor, memory and computer program code), and may even be the same apparatus or different apparatuses.

One or both of the first and second apparatus may be at least one of an electronic device, a portable electronic device, a portable telecommunications device, a navigation device, a satellite navigation device, a mobile phone, a smartphone, a smartwatch, smart eyewear, a phablet, a tablet, a laptop computer, a desktop computer, a server, and a module for one or more of the same.

According to a further aspect, there is provided a method comprising:
  generating, in respect of a road intersection, grouped probe data using probe data derived from probed vehicular movements through the road intersection, wherein the grouped probe data is generated by grouping together probe data comprising vehicle trajectories which have common heading angles at respective points of entry to and exit from the road intersection; and
  using the grouped probe data in lane-level mapping of the road intersection.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means or functional units for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

DESCRIPTION OF SPECIFIC ASPECTS/EMBODIMENTS

Traditional road maps provide limited information about lanes at road intersections. The presence of lane data has applications beyond traditional road-based route guidance. For example, lane data enables lane-level guidance and visualization of lane manoeuvres at road intersections. Lane data is also critical for Highly Automated Driving (HAD) applications.

Due to the number of different types of road intersection and the variety of possible lane-to-lane connections with each road intersection, it is difficult to design mathematical algorithms which can accurately model road intersections at lane level/resolution.

There will now be described an apparatus and associated methods that may provide a possible solution.

Figure 1:
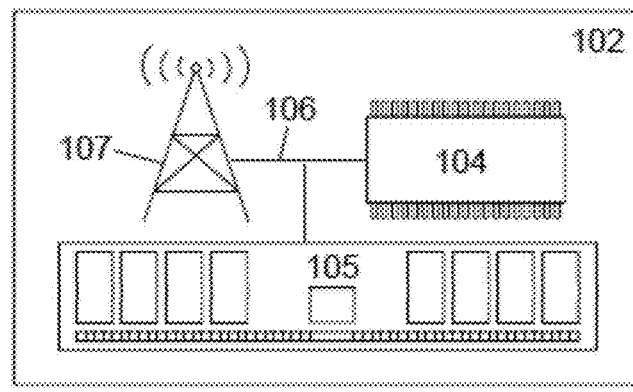
FIG. 1 illustrates schematically a system comprising a first apparatus and a second apparatus configured to perform one or more methods described herein.
Figure 1:
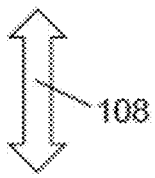
Figure 1:
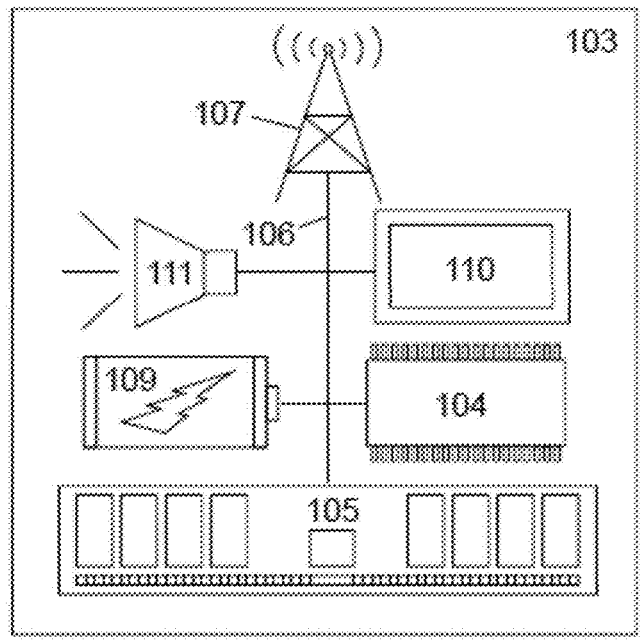

FIG. 1 shows a system 101 comprising a first apparatus 102 and a second apparatus 103 configured to perform one or more methods described herein. One or both of the first apparatus 102 and second apparatus 103 may be at least one of an electronic device, a portable electronic device, a portable telecommunications device, a navigation device, a satellite navigation device, a mobile phone, a smartphone, a smartwatch, smart eyewear, a phablet, a tablet, a laptop computer, a desktop computer, a server, and a module for one or more of the same. The navigation device may or may not be part of a vehicle navigation system. This vehicle navigation system may be built-in to a vehicle in certain embodiments, although in other embodiments may be removable from the vehicle. Not all elements of the navigation device need to be in the vehicle as, in some embodiments, one or more aspects of the navigation/road mapping functionality may be provided by one or more servers/apparatus remote from the vehicle.

In this example, the first apparatus 102 and second apparatus 103 each comprise a respective processor 104 and memory 105, which are electrically connected to one another by a data bus 106. In other examples, however, the first apparatus 102 and second apparatus 103 may share a common processor 104 and memory 105. The first apparatus 102 and second apparatus 103 shown here also comprise a transceiver 107 configured to transmit data to, and/or receive data from, other apparatus/devices (including one another, as illustrated by the bidirectional arrow 108). This communication link 108 between the first apparatus 102 and second apparatus 103 may enable various components of the system 101 to be shared between the first apparatus 102 and second apparatus 103.

The processor 104 is configured for general operation of the apparatus 102, 103 by providing signalling to, and receiving signalling from, the other components to manage their operation. The memory 105 is configured to store computer program code configured to perform, control or enable operation of the apparatus 102, 103. The memory 105 may also be configured to store settings for the other components. The processor 104 may access the memory 105 to retrieve the component settings in order to manage the operation of the other components. The processor 104 may be a microprocessor, including an Application Specific Integrated Circuit (ASIC). The memory 105 may be a temporary storage medium such as a volatile random access memory. On the other hand, the memory 105 may be a permanent storage medium such as a hard disk drive, a flash memory, or a non-volatile random access memory.

The second apparatus 103 (in this example) further comprises a power supply 109, an electronic display 110 and a loudspeaker 111. The power supply 109 is configured to provide the other components with electrical power to enable their functionality, and may comprise one or more of a battery, a capacitor, a supercapacitor, and a battery-capacitor hybrid. The electronic display 110 may be an LED, LCD or plasma display, and is configured to display visual content which is stored on (e.g. on the storage medium) or received by (e.g. via the transceiver) the second apparatus 103. Similarly, the loudspeaker 111 is configured to output audio content which is stored on or received by the second apparatus 103. The visual and audio content may comprise related components of a combined audio visual content. In some examples, the audio and/or visual content may comprise navigational content (such as geographical information and directions, distances, speeds or times of travel). In other embodiments, the display 110, loudspeaker 111 and any user interface components may be remote to, but in communication with, the second apparatus 103 rather than forming part of the second apparatus 103.

Figure 2:
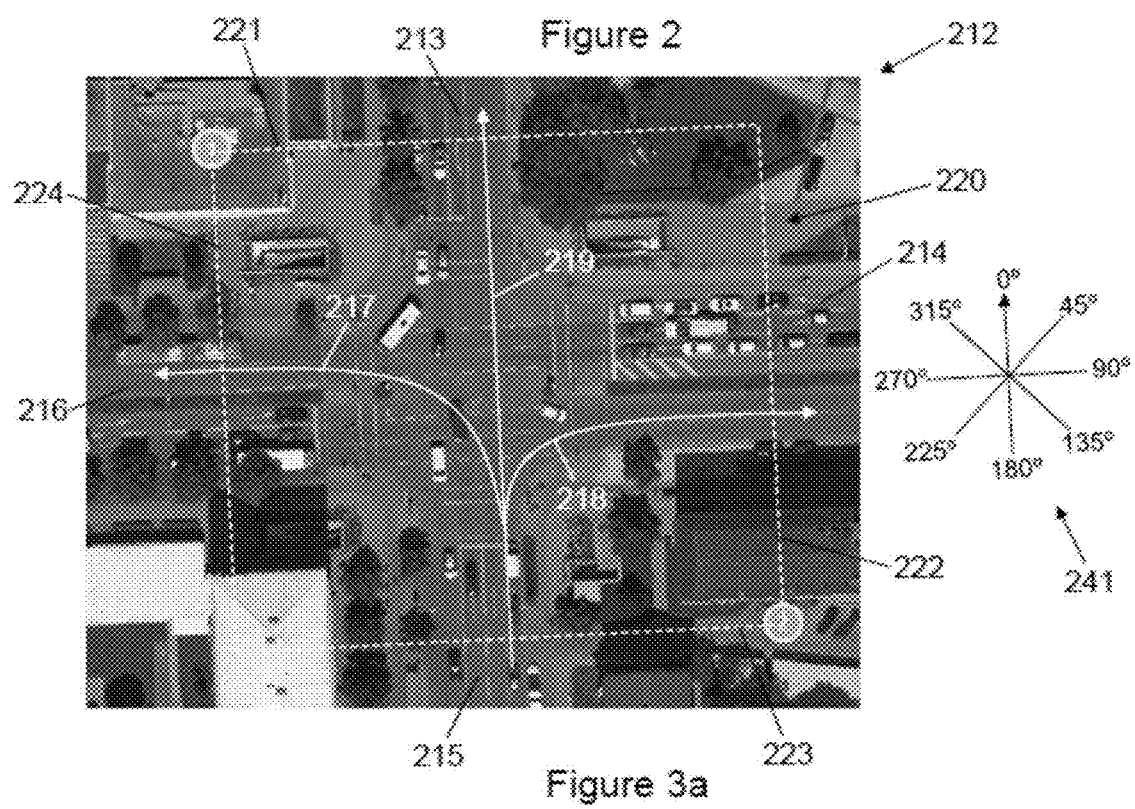
FIG. 2 illustrates schematically one example of a road intersection.

FIG. 2 shows one example of a road intersection 212 to which the system 101 may be applied. In this example, the road intersection 212 is a crossroad, but it could be another type of road intersection 212 such as a junction, a roundabout, an interchange, an onramp, an off-ramp, a road or lane merge, or a road or lane split. This particular road intersection 212 comprises four different road segments 213-216, each having one or more inbound lanes and one or more outbound lanes. A road segment can be considered to be a length of road comprising one or more lanes which head into (inbound lanes) or out of (outbound lanes) of the road intersection, often along a particular common axis of travel. For example, road segment 213 comprises three inbound lanes and two outbound lanes along a 0°-180° common axis of travel, as does road segments 215. A vehicle which is approaching the road intersection 212 on an inbound lane of one of the road segments 213-216 may travel through the road intersection 212 via one or more paths of travel to a corresponding outbound lane of one of the road segments 213-216. For example, in this example, a vehicle approaching the road intersection 212 on an inbound lane of the bottom road segment 215 has the option of travelling left, right or straight-on via respective first 217, second 218 or third 219 paths of travel. In some cases, the vehicle may also be able to perform a u-turn via a fourth path of travel (not shown) and head back in the direction from which it came.

In general, the present system 101 is configured to map the road intersection 212 at lane level using probe data derived from probed vehicular movements through the road intersection 212. This probe data may be collected from apparatus built in/integral to a vehicle or apparatus (e.g. portable electronic device) which is removable from a vehicle, or even aerial photography of vehicular movements. Such apparatus (e.g. satellite based systems) should be able to record location (e.g. latitude, longitude, and in some cases altitude too) at sufficient frequency (e.g. 1 Hz or 10 Hz) to reliably record vehicle trajectories. In this regard, "mapping" of the road intersection 212 may be considered to comprise a determination of the geometry of the various paths of travel 217-219 through the road intersection (e.g. road geometry, lane-to-lane connections and number of lanes). Advantageously, the use of probe data removes the need for any prior information on the road intersection 212 because the monitored trajectories of the vehicles effectively define the paths of travel 217-219. In the following description, some of the method steps are performed using the first apparatus 102 (e.g. a server), and some of the method steps are performed using the second apparatus 103 (e.g. a portable electronic device). It will be appreciated, however, that all of the method steps could be performed using either the first apparatus 102 or the second apparatus 103.

The first apparatus 102 of the system 101 shown in FIG. 1 is configured to generate, in respect of a road intersection 212, grouped probe data using probe data derived from probed vehicular movements through the road intersection 212, and provide the grouped probe data (e.g. available for access via the memory 105 or transmitted via transceiver 107) to the second apparatus 103 for use in lane-level mapping of the road intersection 212. The probe data may comprise any data which can be used to define the trajectory of a vehicle as it travels through the road intersection 212, such as the geographic location and/or heading angle (i.e. the direction in which the "nose" of the vehicle is pointing) of the vehicle at a plurality of points on the trajectory. In practice, the probe data may be derived from the probed vehicular movements of all vehicles travelling through the road intersection 212 over a period of time (e.g. using CCTV), or it may be derived from the probed vehicular movements of one or more predetermined vehicles travelling through the road intersection 212 over a period of time (e.g. using satellite navigation data from each of the predetermined vehicles).

The accuracy of the mapping may depend on the amount of probe data (and thus, the number of monitored trajectories) obtained for the road intersection 212—the accuracy of the mapping typically increasing with the amount of probe data. The period of time required to obtain sufficient probe data will therefore vary depending on the number of vehicles travelling through the road intersection 212. In this respect, the probe data may be obtained over the course of one hour during peak-time (or rush-hour) traffic, or it may be obtained over the course of several hours during the night. Furthermore, the first apparatus 102 may be configured to consider new probe data associated with subsequent vehicular movements through the road intersection 212. In this way, the map can be kept up-to-date with changes that have occurred in the road intersection 212 since the previous version of the map was created. For example, the first apparatus 102 may be configured to generate and provide updated grouped probe data to the second apparatus 103 periodically, in real-time or whenever the probe data derived from subsequent vehicular movements becomes available.

Each vehicle enters and exits the road intersection 212 with respective heading angles which correspond to its particular trajectory. The heading angle of the vehicle as it enters the road intersection 212 may be the same as the heading angle of the vehicle as it exits the road intersection 212 (e.g. if the vehicle travels straight through 219 the road intersection 212). On the other hand, the heading angle of the vehicle as it enters the road intersection 212 may be different to the heading angle of the vehicle as it exits the road intersection 212 (e.g. if the vehicle turns 217, 218 within the road intersection 212). Importantly, the first apparatus 102 is configured to group together probe data comprising vehicle trajectories which have common heading angles at respective points of entry to and exit from the road intersection 212.

The grouping step serves to separate out probe data associated with each of the different paths of travel 217-219 for subsequent analysis. Grouping the probe data based on heading angles has been found to be more effective at separating similar trajectories associated with different paths of travel 217-219 than grouping the probe data based on geographic location. This feature is advantageous because the inadvertent grouping together of trajectories associated with different paths of travel 217-219 introduces errors in the subsequent analysis which can reduce the accuracy of the mapping. The probe data may be grouped using one or more standard clustering techniques, such as the k-means clustering method (as used in the subsequent data analysis described later).

The points of entry to and exit from the road intersection may be defined in a number of different ways. For example, the points of entry and exit may correspond to geographical locations on respective inbound and outbound lanes of road segments 213-216 of the road intersection 212 at a predefined distance from a reference position of the road intersection 212. The reference position (e.g. latitude, longitude, and altitude) of the road intersection 212 could be the geographical location at which vehicle trajectories associated with different paths of travel 217-219 intersect one another, or it could be the geographical location at the physical centre of the road intersection 212 (e.g. determined from an aerial photograph of the road intersection 212).

On the other hand, the points of entry and exit may correspond to geographical locations at which the respective vehicles cross a predefined boundary 220 encompassing the road intersection. This latter scenario is illustrated in FIG. 2. As shown, the predefined boundary 220 could be a two-dimensional boundary (e.g. a polygon) drawn around the road intersection 212 in plan-view to define the orientation of the vehicles as they enter and exit the intersection 212. The points denoted "1" and "2" in FIG. 2 are simply the extremities used to set the length and width of the boundary 220. In general, the heading angles at the points of entry to and exit from the boundary 220 correspond to the direction of traffic flow within the inbound and outbound lanes of the road segments 213-216 of the road intersection 212, respectively. In some cases, the boundary 220 may be centered on the physical centre of the road intersection 212, and may be predefined such that each edge 221-224 of the boundary 220 is perpendicular to the length of a respective road segment 213-216 of the road intersection 212, as shown in this figure.

It is important to note that the square-shaped boundary 220 is just one specific example, and the size and shape of the boundary 220 will typically vary according to the size and shape of the road intersection 212. However, the size of the boundary 220 is such that it encompasses (e.g. contains and is larger than) the road intersection 212 yet intersects the road segments 213-216 and their associated lanes. In this respect, the boundary 220 will typically be larger than the road intersection 212 to encompass at least part of the road segments 213-216. One reason for encompassing part of the road segments 213-216 with the boundary 220 is that the road segments 213-216 limit the orientation (and therefore the heading angles) of the vehicles entering and exiting the road intersection 212. In this way, the heading angles at the points of entry and exit are more likely to be parallel to the orientation of the road segments 213-216, which can make it easier to reliably group the associated probe data.

The size of the road intersection 212 may be determined based on the locations of frequent vehicle stops (e.g. due to traffic signals allowing or preventing traffic from entering the road intersection 212, or pedestrian crossings which often halt traffic at the periphery of road intersections). Additionally or alternatively, the size of the road intersection 212 may be determined based on knowledge of similar road intersections in the area, town, city, county, region or country in which the road intersection 212 is located. For example, in the US, a 50 m×50 m rectangular polygon, centered at the mid-point of the intersection, may be considered suitable in many cases. Of course, this will depend on the actual size of the road intersection and adjacent roads/intersections which may not form part of the approach to or exit from the road intersection.

In certain cases, the size and shape of the boundary can be determined using existing 2D map computer models. Such existing 2D maps model roads by links, each link being a short segment of road with a unique character. The location of the intersection link is also already marked. Thus, the size and shape of the boundary 220 can be determined by considering where a non-intersection link connects to the intersection link. In cases were existing 2D computer models are not used, the boundary can be defined with respect to the extremities of the change in heading direction and location in trajectories associated with the intersection, for example.

As well as defining the points of entry to and exit from the road intersection 212, the predefined boundary 220 may also act as a reference to measure the heading angles of the vehicles. In this regard, the heading angle of a vehicle may be measured with respect to the respective edge 221-224 of the boundary 220 which the vehicle crosses during entry to and exit from the boundary 220 (i.e. local measurement). For example, it may be measured relative to the normal or tangent of the boundary edge 221-224. In cases where the road intersection 212 comprises many road segments 213-216, however, it may be more practical to measure the heading angle with respect to a common axis (i.e. global measurement). This is illustrated in FIG. 2 by the angular indicator 241 to the right of the road intersection 212. In this example, a vehicle following the right-hand path of travel 218 would have a trajectory with an entry heading angle of about 0° and an exit heading angle of about 90°; a vehicle following the left-hand path of travel 219 would have a trajectory with an entry heading angle of about 0° and an exit heading angle of about 270°; and a vehicle following the straight path of travel 217 would have a trajectory with an entry heading angle of about 0° and an exit heading angle of about 0°.

It will be appreciated that, in some cases, the boundary 220 may be a virtual boundary (which may or may not be symmetrical about the centre of the road intersection 212) at which the entry/exit angle is determined. Thus, it could just be a particular distance along the respective road segments 213-216 away from the road intersection 212 to allow the trajectories to be reasonably associated with the road intersection 212 (e.g. 10 m from the intersection centre for segment 215 but 20 m from the intersection centre for segment 213). Furthermore, the inbound lanes of a particular road segment 213-216 may or may not intersect the same boundary edge 221-224 as the outbound lanes of the road segment 213-216. Nevertheless, all of the respective inbound or outbound lanes of a particular road segment 213-216 would share the same boundary edge to enable measurement of the respective entry/exit heading angles.

The accuracy of the mapping is also dependent upon the precision with which the vehicle heading angles can be measured. This will typically be dictated by the resolution of the equipment used to measure the heading angles (e.g. CCTV cameras, geographical location data, an accelerometer or a compass), but may be affected by environmental conditions (e.g. visibility, precipitation and brightness). In this respect, the common heading angles used in the grouping step may comprise all heading angles which fall within one or more of ±1°, ±5°, ±10°, ±15°, ±20°, ±25°, ±30°, ±35°, ±40° and ±45° of one another depending on the precision of the angular measurements.

In some road intersections 212, there may be different paths of travel 217-219 which have the same heading angles at the points of entry to an exit from the predefined boundary 220. This situation may occur, for example, if road works cause one lane of a road segment 213-216 to be diverted without affecting another lane of the same road segment 213-216. To handle such a road intersection 212, the first apparatus 102 may be configured to further group the probe data based on the heading angles of the trajectories at one or more points within the boundary 220. This further grouping step therefore serves to separate out the probe data associated with different paths of travel 217-219 which have common entry and exit heading angles.

The second apparatus 103 of the system 101 shown in FIG. 2 is configured to use the grouped probe data provided by the first apparatus 102 in lane-level mapping of the road intersection 212. Before the grouped probe data is used, however, the second apparatus 103 may perform a filtering step to remove any probe data in respect of vehicle trajectories which constitute noise or outliers that could skew the results (e.g. by using conventional statistical techniques such as Gaussian confidence intervals). This filtering step serves to further increase the accuracy of the mapping.

Figure 3A:
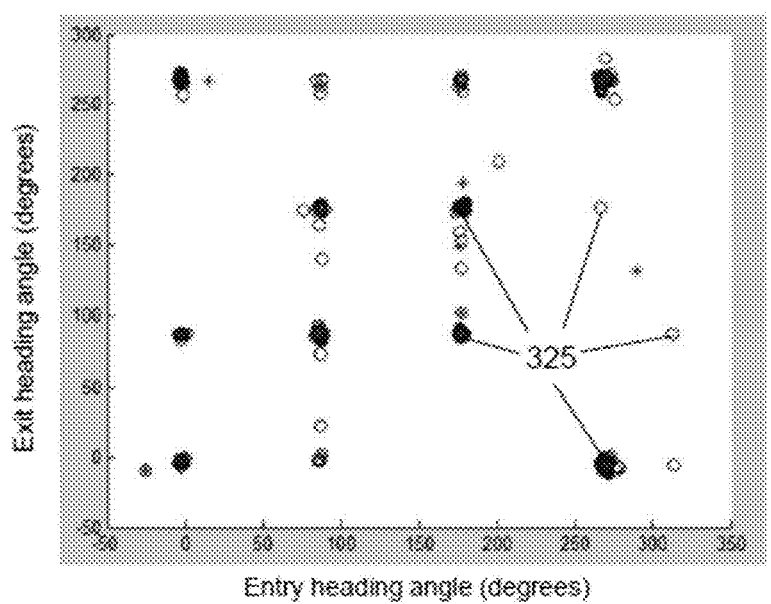
FIG. 3a illustrates schematically probe data comprising the trajectories of vehicles travelling through the road intersection of FIG. 2 which have been grouped together based on their heading angles.
Figure 3B:
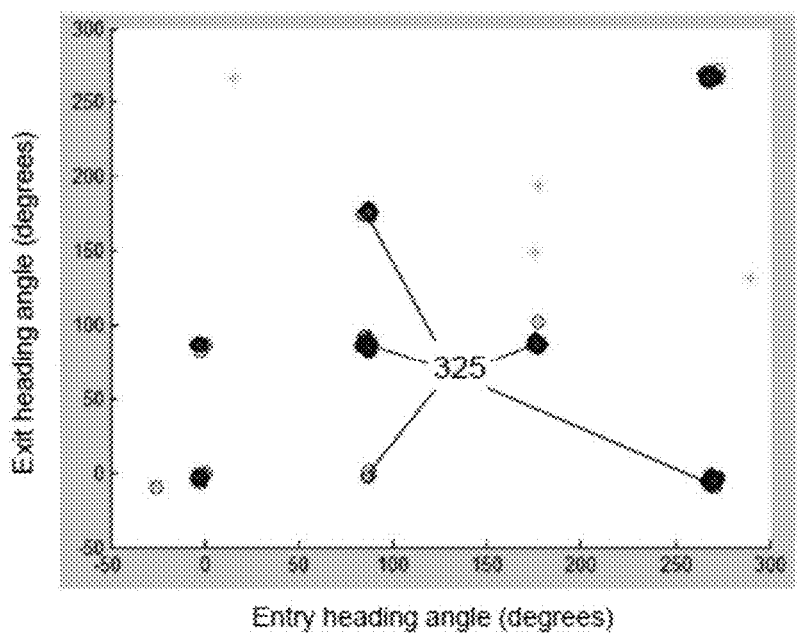
FIG. 3b illustrates schematically the grouped probe data of FIG. 3a after being filtered to remove noise and outliers.

FIGS. 3a and 3b show the vehicle trajectories 325 through the road intersection 212 of FIG. 2 before and after filtering, respectively. In these figures, the trajectories 325 are represented by their entry (x-axis) and exit (y-axis) heading angles (in degrees). As expected for a crossroad, the vehicle trajectories 325 generally follow the left-turn 219, right-turn 218 and straight-through 217 paths of travel. This is clear from the clusters of trajectories 325 with 0°, 90°, 180° and 270° heading angles. As can be seen by comparing FIG. 3a with FIG. 3b, the filtering step has removed the trajectories 325 with entry and exit heading angles which do not correspond with the above-mentioned paths of travel 217-219. These trajectories 325 may, for example, correspond with vehicles which have pulled over, road maintenance vehicles, or vehicles which have taken a wrong turn.

Figure 4:
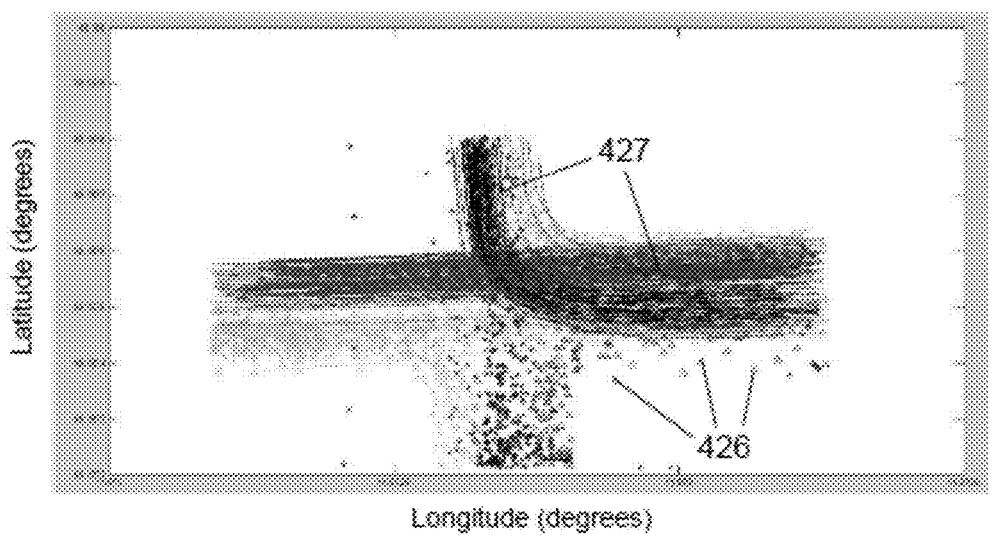
FIG. 4 illustrates schematically the different paths of travel through the road intersection of FIG. 2 as defined by the filtered grouped probe data of FIG. 3b.

FIG. 4 illustrates the different paths of travel 217-219 through the road intersection 212 of FIG. 2 as defined by the filtered group probe data of FIG. 3b. As mentioned previously, each group of probe data defines a separate path of travel 217-219 from an inbound lane of a road segment to an outbound lane of a road segment 213-216. The sequence of geographical locations (coordinates) forming each vehicle trajectory 325 are shown as data points 426, and in some cases, lines 427 have been overlaid on the data points 426 to help visualise the vehicle trajectories 325. Each data point 426 within a particular group of probe data (i.e. with respective common entry and exit heading angles) are denoted with the same legend, e.g. light triangles, dark triangles, light crosses or dark crosses.

The second apparatus 103 is configured to use the (filtered) grouped probe data to determine the geometry of the various paths of travel 217-219 through the road intersection 212. For each group of probe data, the second apparatus 103 determines a centreline 528 which defines the shape of the path of travel 529. This can be performed by minimising the average distance of all trajectories 325 within that group to the centreline 528.

Figure 5:
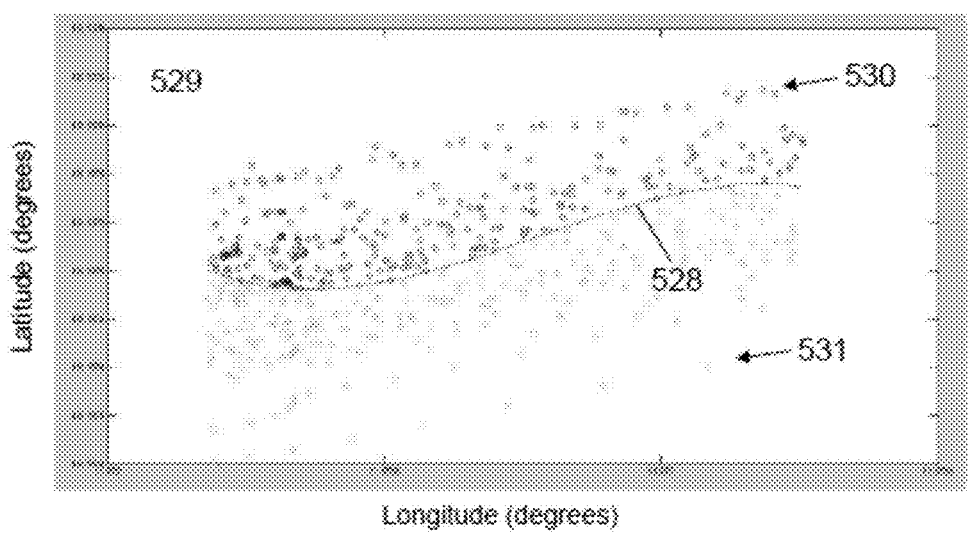
FIG. 5 illustrates schematically a centreline defining the shape of a path of travel.

FIG. 5 shows a centreline 528 determined for a group of probe data. Once the centreline 528 has been determined, the second apparatus 103 is then able to determine the width of the path of travel 529. This may be based on the physical distance between the outermost trajectories 530, 531 at one or more points along the centreline 528. The outermost trajectories 530, 531 essentially define the drivable boundaries of the path of travel 529, and may correspond with the physical edges of a road (e.g. adjacent to a verge, central reservation, hard shoulder or closed lane) or the lateral extremities of a safe path of travel (e.g. to avoid sharp turns or crashes). It can be useful to determine the width of the path of travel 529 at a plurality of points along its length in order to account for changes in width. Changes in width can occur, for example, when the inbound road segment has a different number of lanes than the outbound road segment 213-216. In some cases, the second apparatus 103 may be configured to perform an additional filtering step to remove any trajectories (outliers) which are remote from the majority of the other trajectories (e.g. by using conventional statistical methods to remove data outside a specific Gaussian confidence threshold), before determining the width of the path of travel 529 based on the outermost remaining trajectories 530, 531. This approach may be used, for example, to remove probe data associated with vehicles using the hard shoulder, such as road maintenance vehicles.

Once the width of the path of travel 529 has been determined, the second apparatus 103 can then calculate (or at least estimate) the number of lanes within the path of travel 529. This may be achieved by dividing the determined width by a known typical lane width. The typical lane width may be the most common, average or median lane width for the type of road intersection 212 being considered, or the most common, average or median lane width for the area, town, city, county, region or country in which the road intersection 212 is located.

Figure 6:
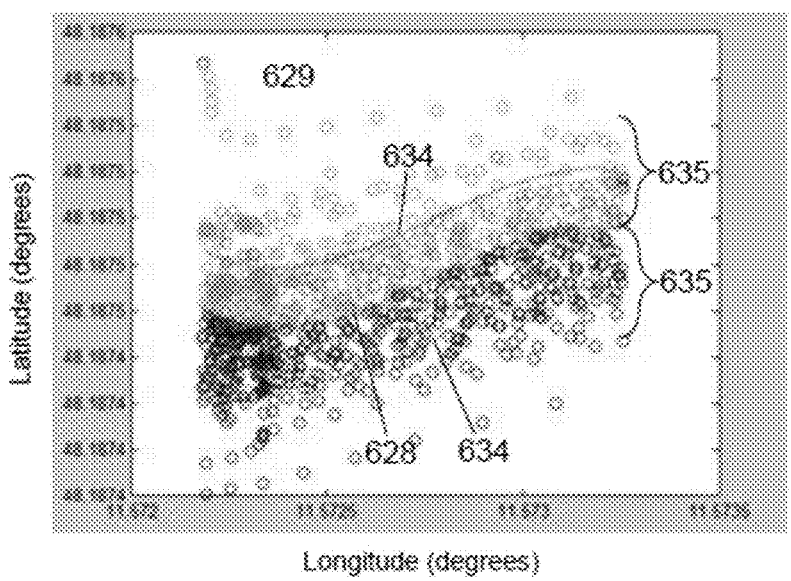
FIG. 6 illustrates schematically the different lanes within a path of travel.

FIG. 6 shows the path of travel 629 of FIG. 5 in which the centrelines 634 of the individual lanes 635 have been defined together with the centreline 628 of the path of travel 629. In this example, the path of travel 629 comprises two lanes 635. Now that the shape, width and number of lanes of the path of travel are known, the second apparatus 103 is able to create a graphical representation 736 of the road intersection 212. A graphical representation 736 is particularly useful for route navigation (e.g. in a satellite navigation device) as it helps a user to visualise the proposed route of travel.

Figure 7:
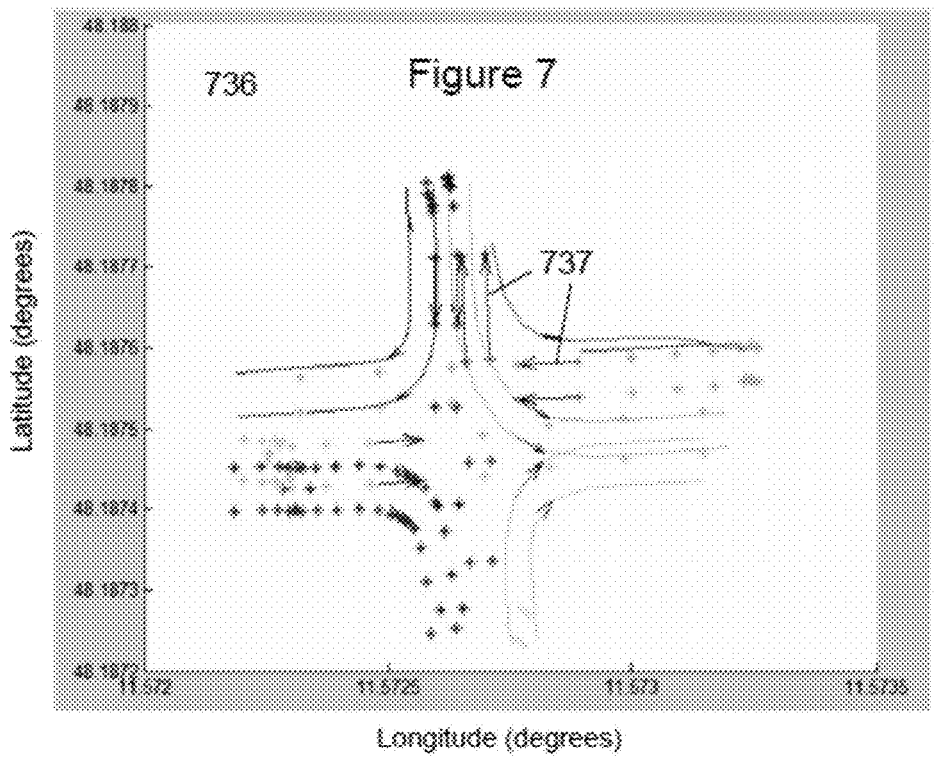
FIG. 7 illustrates schematically a graphical representation of the road intersection of FIG. 2 created using the filtered grouped probe data of FIG. 3b.

FIG. 7 shows the graphical representation 736 for the road intersection 212 of FIG. 2 created using the grouped probe data of FIG. 3b. The graphical representation 736 illustrates the road geometry, number of lanes, lane-to-lane connections, and direction 737 of traffic flow within the road intersection 212. As mentioned previously, such graphical representations 736 are typically created based on a detailed knowledge of the physical layout of the road intersections 212. With the present approach, however, they can be created using just the probe data (possibly in combination with a known typical lane width as described above). Advantageously, this approach: requires little (if any) prior information on the road intersection 212; can be performed automatically by the apparatus 102, 103 without user input; produces an end result which is representative of the road intersection 212 at the time when the probe data was recorded; can be updated whenever new probe data becomes available; can handle noise and outliers in the probe data; can deal with any size, shape and type of road intersection 212; and can estimate the number of lanes 635 within each path of travel 217-219 even when there are no road markings within the road intersection 212.

Figure 8:
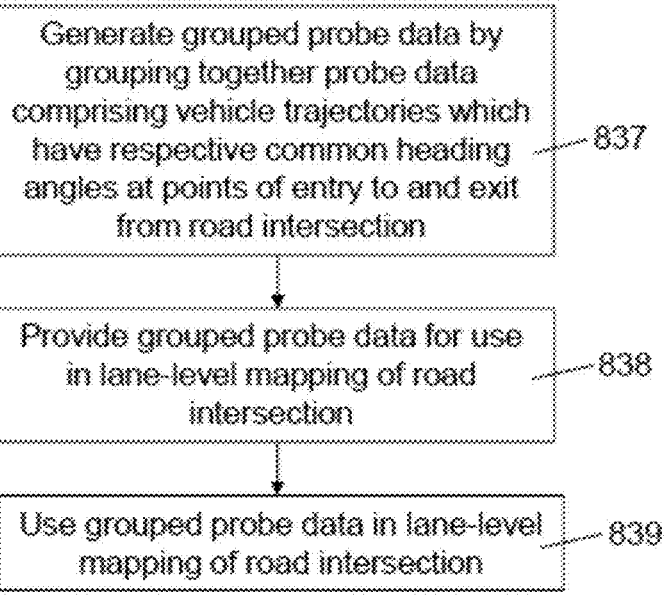
FIG. 8 illustrates schematically the main steps of a method described herein.

FIG. 8 illustrates schematically the main steps 837-839 of the method described herein. The method generally comprises: generating grouped probe data by grouping together probe data comprising vehicle trajectories which have respective common heading angles at points of entry to and exit from the road intersection 837; providing the grouped probe data for use in lane-level mapping of the road intersection 838; and using the grouped probe data in lane-level mapping of the road intersection 839. As mentioned previously, whilst the first apparatus 102 of the system 101 described herein may be configured to perform the generation 837 and providing 838 steps, and the second apparatus 103 of the system 101 may be configured to perform the using step 839, either one of the first 102 and second 103 apparatus could be used to perform each and every step 837-839 of the method by itself.

Figure 9:
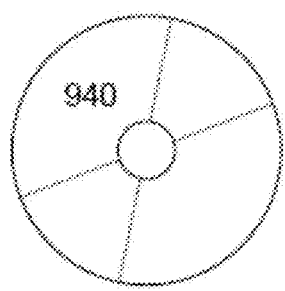
FIG. 9 shows a computer-readable medium comprising a computer program configured to perform, control or enable one or more methods described herein.

FIG. 9 illustrates schematically a computer/processor readable medium 940 providing a computer program according to one embodiment. The computer program may comprise computer code configured to perform, control or enable one or more of the method steps 837-839 of FIG. 8. In this example, the computer/processor readable medium 940 is a disc such as a digital versatile disc (DVD) or a compact disc (CD). In other embodiments, the computer/processor readable medium 940 may be any medium that has been programmed in such a way as to carry out an inventive function. The computer/processor readable medium 940 may be a removable memory device such as a memory stick or memory card (SD, mini SD, micro SD or nano SD).

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a processor and memory including computer program code, the memory and computer program code configured to, with the processor, enable the apparatus at least to:

receive probe data from a plurality of vehicles, wherein the probe data corresponds to vehicular movements of the plurality of vehicles through a road intersection along a plurality of different paths, and comprises at least a geographic location and a heading angle of the respective vehicle;

group the probe data based on trajectories of the plurality of vehicles through the road intersection to generate grouped probe data;

determine one or more paths of travel for the plurality of vehicles based on the grouped probe data, where each path of travel is defined using a different combination of a heading at a point of entry into the road intersection and a heading at a point of exit from the road intersection, wherein the point of entry into the road intersection is defined where a respective vehicle crosses a predefined boundary around the road intersection when entering the road intersection, wherein the point of exit is defined where a respective vehicle crosses the boundary around the road intersection when exiting the road intersection; and generate a map of the road intersection using the one or more paths of travel.

2. The apparatus of claim 1, wherein the probe data is derived from the probed vehicular movements of all vehicles, or one or more predetermined vehicles, traveling through the road intersection over a period of time.

3. The apparatus of claim 1, wherein the apparatus is configured to generate and provide updated grouped probe data using probe data derived from subsequent probed vehicular movements through the road intersection.

4. The apparatus of claim 3, wherein the apparatus is configured to generate and provide the updated grouped probe data in a manner comprising one or more of: periodically, in real-time, and whenever the probe data derived from subsequent vehicular movements becomes available.

5. The apparatus of claim 1, wherein the points of entry to and exit from the road intersection correspond to geographical locations on respective inbound and outbound lanes of road segments of the road intersection at a predefined distance from a reference position of the road intersection.

6. The apparatus of claim 1, wherein the apparatus is configured to group the probe data using one or more clustering techniques.

7. A computer program product comprising at least one non-transitory computer-readable storage medium having computer-executable program code instructions stored therein, the computer-executable program code instructions comprising program code instructions to:

receive probe data from a plurality of vehicles, wherein the probe data corresponds to vehicular movements of the plurality of vehicles through a road intersection along a plurality of different paths, and comprises at least a geographic location and a heading angle of the respective vehicle;

group the probe data based on trajectories of the plurality of vehicles through the road intersection to generate grouped probe data;

determine one or more paths of travel for the plurality of vehicles based on the grouped probe data, where each path of travel is defined using a different combination of a heading at a point of entry into the road intersection and a heading at a point of exit from the road intersection, wherein the point of entry into the road intersection is defined where a respective vehicle crosses a predefined boundary around the road intersection when entering the road intersection, wherein the point of exit is defined where a respective vehicle crosses the boundary around the road intersection when exiting the road intersection; and generate a map of the road intersection using the one or more paths of travel.

8. The computer program product of claim 7, wherein the probe data is derived from the probed vehicular movements of all vehicles, or one or more predetermined vehicles, traveling through the road intersection over a period of time.

9. The computer program product of claim 7, further comprising program code instructions to generate and provide updated grouped probe data using probe data derived from subsequent probed vehicular movements through the road intersection.

10. The computer program product of claim 9, further comprising program code instructions to generate and provide the updated grouped probe data in a manner comprising one or more of: periodically, in real-time, and whenever the probe data derived from subsequent vehicular movements becomes available.

11. The computer program product of claim 7, wherein the points of entry to and exit from the road intersection correspond to geographical locations on respective inbound and outbound lanes of road segments of the road intersection at a predefined distance from a reference position of the road intersection.

12. The computer program product of claim 7, further comprising program code instructions to group the probe data using one or more clustering techniques.

13. A method comprising:

receiving probe data from a plurality of vehicles, wherein the probe data corresponds to vehicular movements of the plurality of vehicles through a road intersection along a plurality of different paths, and comprises at least a geographic location and a heading angle of the respective vehicle;

grouping the probe data based on trajectories of the plurality of vehicles through the road intersection to generate grouped probe data;

determining one or more paths of travel for the plurality of vehicles based on the grouped probe data, where each path of travel is defined using a different combination of a heading at a point of entry into the road intersection and a heading at a point of exit from the road intersection, wherein the point of entry into the road intersection is defined where a respective vehicle crosses a predefined boundary around the road intersection when entering the road intersection, wherein the point of exit is defined where a respective vehicle crosses the boundary around the road intersection when exiting the road intersection; and generating a map of the road intersection using the one or more paths of travel.

14. The method of claim 13, wherein the probe data is derived from the probed vehicular movements of all vehicles, or one or more predetermined vehicles, traveling through the road intersection over a period of time.

15. The method of claim 13, further comprising generating and providing updated grouped probe data using probe data derived from subsequent probed vehicular movements through the road intersection.

16. The method of claim 15, further comprising generating and providing the updated grouped probe data in a manner comprising one or more of: periodically, in real-time, and whenever the probe data derived from subsequent vehicular movements becomes available.

17. The method of claim 13, wherein the points of entry to and exit from the road intersection correspond to geographical locations on respective inbound and outbound lanes of road segments of the road intersection at a predefined distance from a reference position of the road intersection.

* * * * *